United States Patent [19]

Pierson et al.

[11] Patent Number: 4,709,901

[45] Date of Patent: Dec. 1, 1987

[54] FLUID POWER OPERATED SLIDING GATE VALVE SYSTEM FOR TANK TRUCKS, PIPELINES, STORAGE TANKS AND THE LIKE

[75] Inventors: Karl B. Pierson; Thomas E. Mooney, both of Warren, Pa.; William G. Jones, Frewsburg, N.Y.

[73] Assignee: Betts Industries, Inc., Warren, Pa.

[21] Appl. No.: 39,925

[22] Filed: Apr. 20, 1987

[51] Int. Cl.$^4$ ........................................... F16K 31/124
[52] U.S. Cl. .................................... 251/58; 251/63.6; 251/144; 251/327; 251/329; 251/63.5; 137/75; 137/315
[58] Field of Search ................. 251/62, 63, 63.4, 63.5, 251/63.6, 58, 143, 144, 326, 327, 328, 329; 137/74, 75, 81, 315

[56] References Cited

U.S. PATENT DOCUMENTS

| | | | |
|---|---|---|---|
| 1,929,867 | 10/1933 | Hall, Jr. | 251/62 |
| 1,977,554 | 10/1934 | Hall, Jr. | 251/62 |
| 2,004,715 | 6/1935 | Thwaits | 137/75 |
| 2,012,003 | 8/1935 | Hall, Jr. | 251/62 |
| 2,600,907 | 6/1952 | DeFrees | 137/75 |
| 3,466,010 | 9/1969 | Jung | 251/62 |
| 3,531,078 | 9/1970 | Hose et al. | 251/63.6 |
| 3,974,850 | 8/1976 | Pierson | 251/313 |
| 4,009,862 | 3/1977 | DeFrees | 251/63.5 |
| 4,378,932 | 4/1983 | Avery | 251/327 |
| 4,406,299 | 9/1983 | DeFrees | 137/75 |

FOREIGN PATENT DOCUMENTS 729911 8/1932 France .................................. 251/58

Primary Examiner—George L. Walton
Attorney, Agent, or Firm—Baldwin, Egan, Hudak & Fetzer

[57] ABSTRACT

A remotely controllable fluid pressure actuated mechanism for controlling the actuation of a sliding gate valve or the like, for use with tank trucks, pipelines, storage tanks or the like, for helping to eliminate the possibility of hazardous spills. The mechanism is adapted for mounting on the bonnet of a generally conventional sliding gate valve, and comprises spaced, relatively movable upper and lower (when the gate valve is oriented vertically) supports connected by constant force springs, and wherein the upper support is attached to the operating rod of the gate valve for actuating the gate valve upon upward movement of the upper support against the resistance of the constant force springs, and relative to the lower support, and with there being provided remotely controllable, reciprocal, fluid powered motor units extending between the upper and lower supports and when actuated from a source of pressurized fluid, being adapted to move the upper support away from the lower support, to thus cause actuation of the gate valve. Bypassing the pump of the system or dumping the pressurized fluid in the system causes automatic closing of the gate valve as initiated by the constant force springs.

19 Claims, 6 Drawing Figures

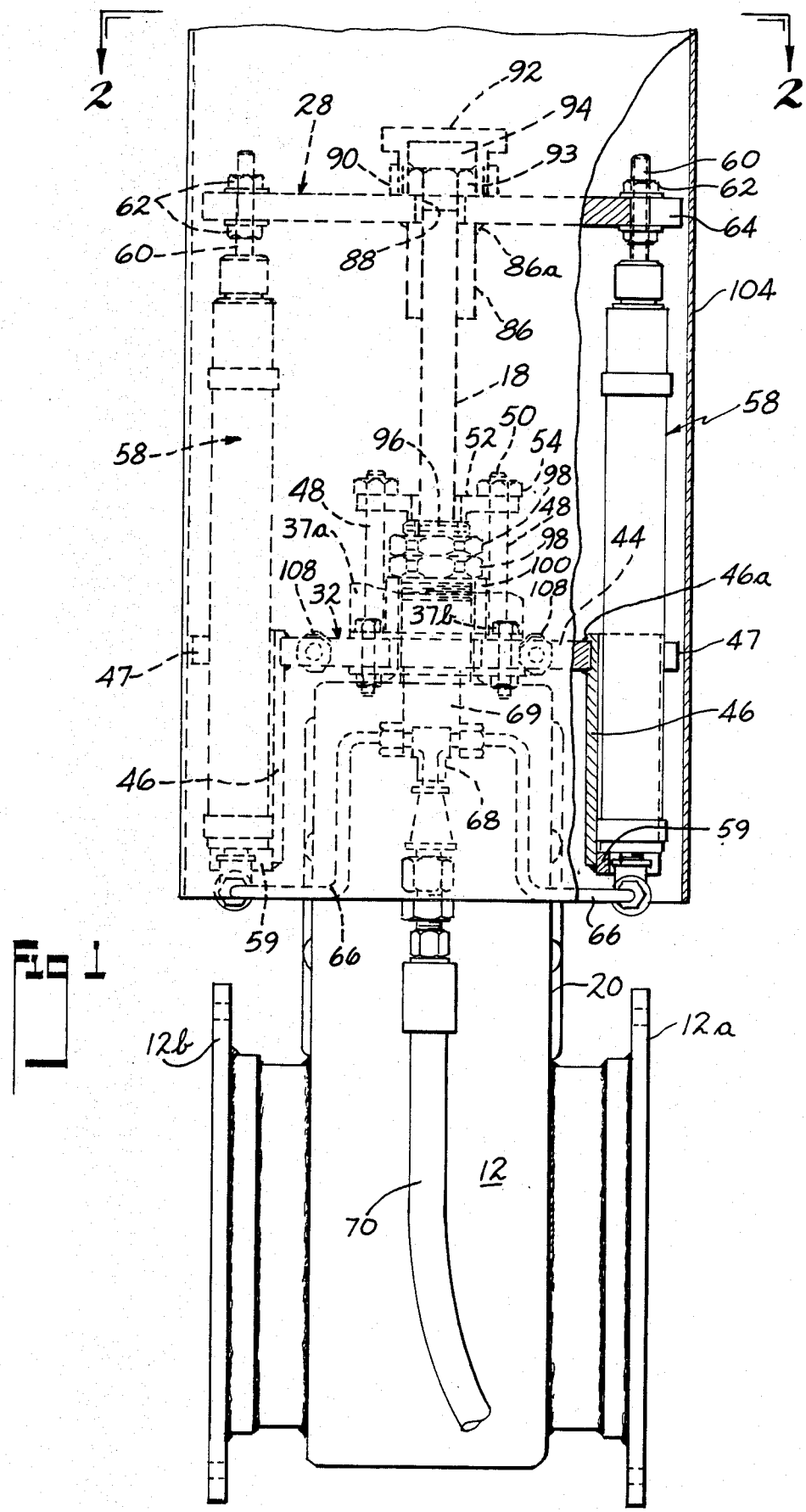

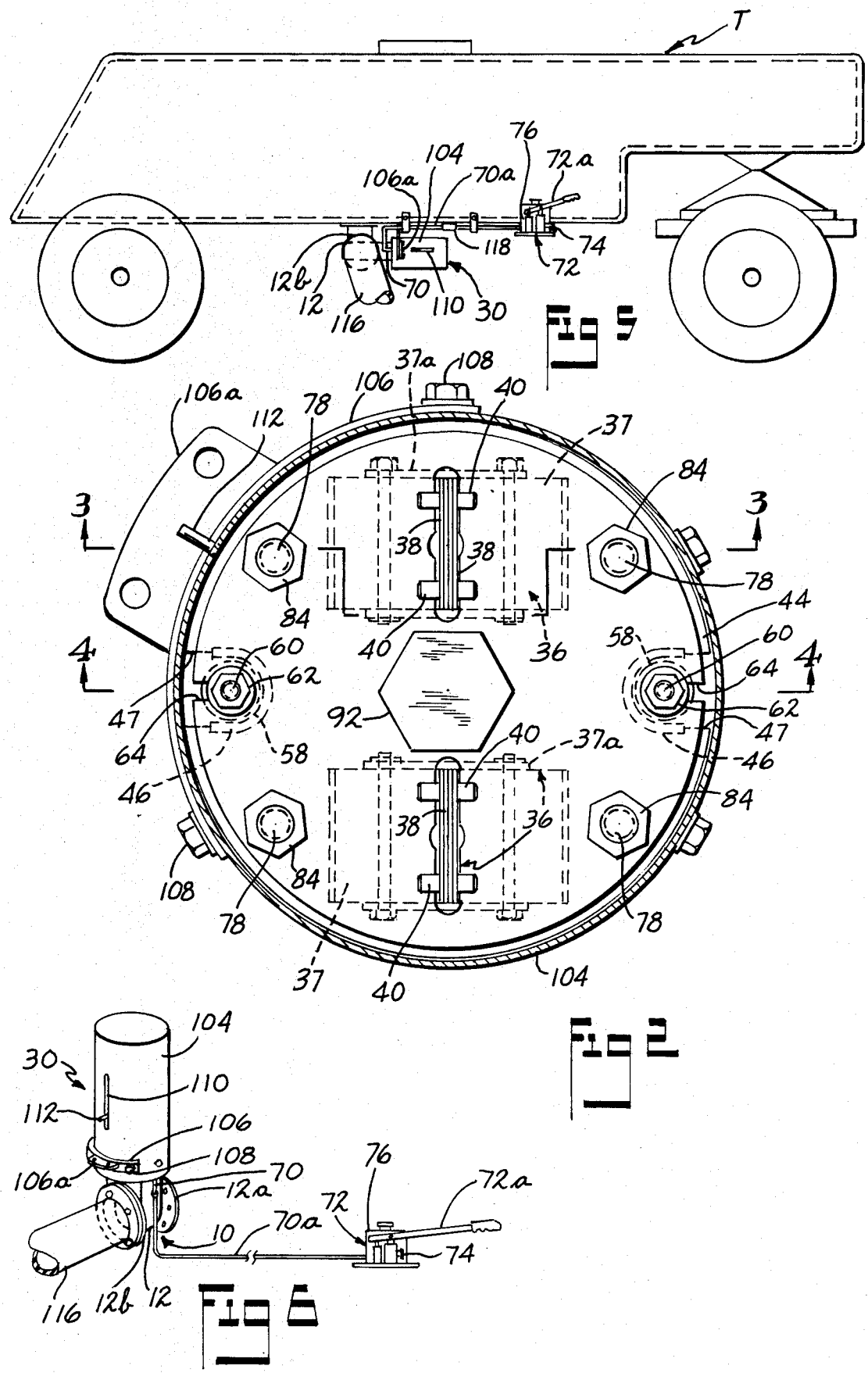

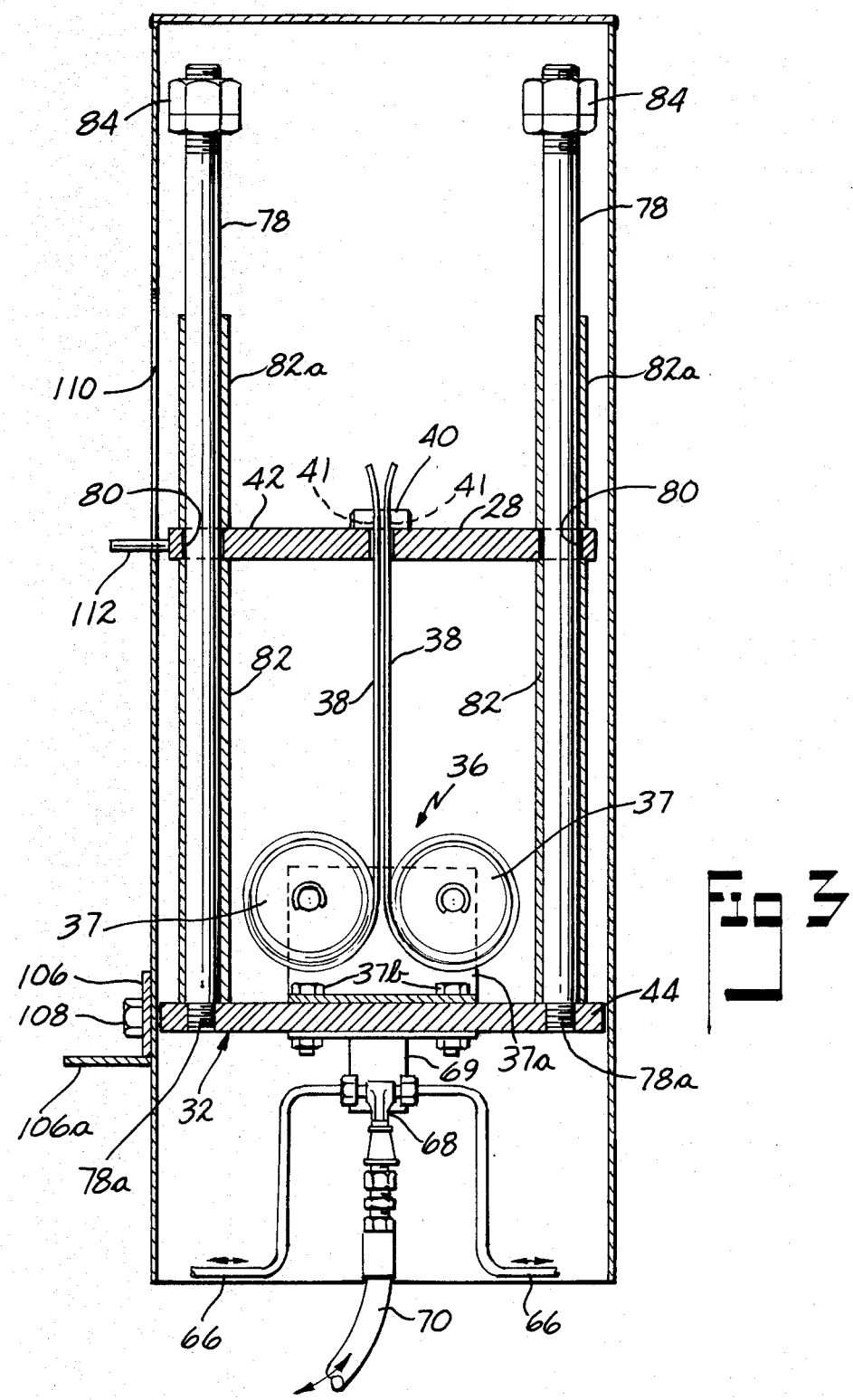

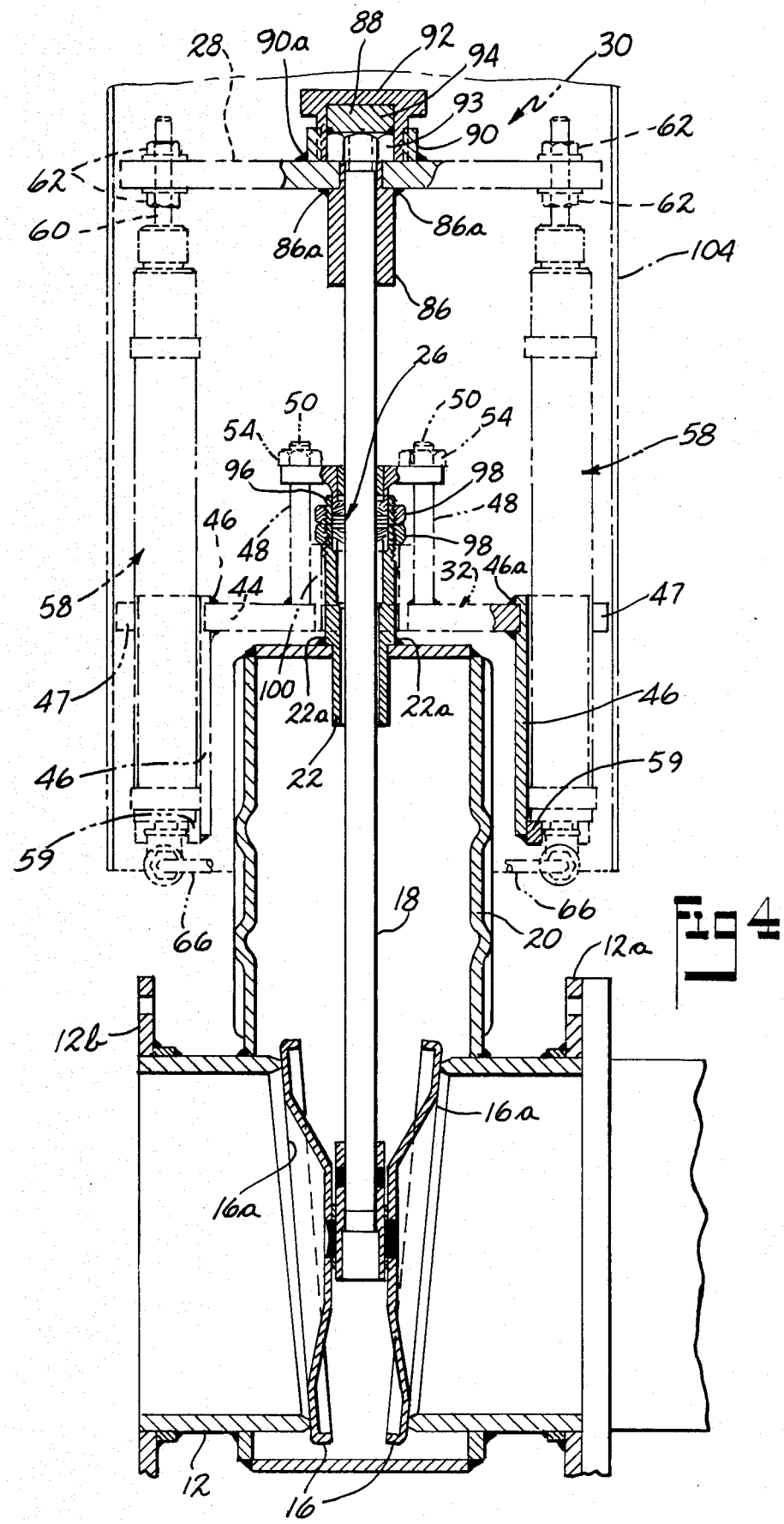

FLUID POWER OPERATED SLIDING GATE VALVE SYSTEM FOR TANK TRUCKS, PIPELINES, STORAGE TANKS AND THE LIKE

This invention relates to a power operated control mechanism for controlling the actuation of a slide gate valve or the like, and more particularly relates to an emergency closing slide gate for use for instance in conjunction with tank trucks, pipelines, storage tanks and the like, for aiding in preventing hazardous spills of fluid from the tank truck, pipeline, storage tank or the like.

BACKGROUND OF THE INVENTION

Various types of remotely controllable emergency valves are known in the prior art for use in connection with preventing hazardous spills. An emergency valve as the term is utilized herein refers to a valve which is normally biased to a closed position, and is opened only when an operator is in active control of the operation of the valve, so that the valve remains open only so long as fluid control pressure is maintained in the control system therefor. It is well known in this art that liquids such as, for instance, hazardous type liquids (e.g. inflammable or corrosive type liquids) are often carried or stored in tanks, either stationary or mobile, or pipelines and the like, and the discharge thereof may be controlled through a conduit which may utilize a gate valve for controlling the flow of liquid through the conduit. If the outlet connections or controls to the conduit are damaged by accident or otherwise, inadvertent discharge of the liquid contents in the conduit may result in considerable damage to property and persons, or may result in a disastrous fire with attendant injury and damage to individuals and/or property in the vicinity.

Many types of fluid controlled or hydraulically controlled emergency valves are known in the art. U.S. Pat. No. 4,009,862 dated Mar. 1, 1977 to Joseph H. DeFrees and entitled Hydraulically Balanced Remote Controlled Emergency Valve For Storage Tanks, is one example. The use of constant force springs in valving whereby the fluid pressure force required to move the valve member remains substantially constant throughout the travel of the valve member, is also known in the art, and is disclosed for instance, in U.S. Pat. No. 3,974,850 in the name of Karl B. Pierson, dated Aug. 17, 1976 and entitled High Volume Fluid Pressure Relief Valve.

SUMMARY OF THE INVENTION

The present invention provides a fluid power operated mechanism adapted to be readily mounted upon a sliding gate valve, or the like, for use in controlling fluid flow in a conduit associated with tank trucks, pipelines, storage tanks or other like environments and particularly those involving hazardous materials or liquids, and which mechanism embodies constant force spring means for urging the gate valve to a closed position, but which valve is actuatable upon application of pressurized fluid to reciprocal motor units in the fluid power operated mechanism, for overcoming the force of the spring means and causing opening of the gate valve, and wherein the force required to open the gate valve to fully opened position does not increase appreciably, since the load on the said spring means does not increase with the length of travel of the reciprocal motor units utilized to actuate the mechanism.

In the event of an emergency or an accident to the conduit carrying the hazardous material or to the controls for the conduit for controlling the flow of hazardous material therethrough, the gate valve is permitted to rapidly close by either dumping the pressurized fluid in the control system, or by manual interruption by the operator, of the source of pressurized fluid to the reciprocal motor units; automatic dumping of the system may be effectively accomplished in the event of fire by the use of fuses or other thermal controls, for automatically causing the dumping of the pressurized fluid to the motor units, and thus automatically causing the gate valve to move toward closed condition under the biasing influence of the constant force springs.

The control unit of the invention is rugged in construction and operation and can be conveniently mounted upon existing types of gate valves, and provides for the expeditious actuation thereof.

Accordingly, an object of the invention is to provide a novel, remotely controllable emergency valve for controlling the flow of fluid material through a conduit associated with a tank truck, a pipeline, a storage tank or the like, for aiding in elimination of hazardous spills.

Another object of the invention is to provide a novel emergency valve operating control mechanism which is readily mountable upon existing types of sliding gate valves, for remotely controlling the opening and closing of the valve, and which embodies constant force spring means for urging the valve head and associated operating rod of the gate valve toward predetermined position (e.g. closed position) but which spring means can be overcome and the gate valve actuated by means of fluid powered reciprocal motor units of the said operating mechanism.

A still further object of the invention is to provide an emergency fluid power operated control mechanism of the latter type that is simple in construction and effective in operation to aid in preventing inadvertent discharge of liquid in a conduit in the event of accident, and wherein the mechanism is mountable in a plurality of positions in conjunction with a sliding type gate valve, for operating the latter, but which in the event of an emergency, will automatically cause the gate valve to move to closed condition.

A still further object of the invention is to provide a control mechanism of the aforementioned type which can be readily maintained and repaired in the event of a failure of one or more of the reciprocal motor units utilized to actuate the mechanism, and without the need to disassemble the entire mechanism or remove it from the associated tank vehicle or other related equipment.

A still further object of the invention is to provide a sliding gate valve and control mechanism assembly which is reliable in operation and rugged in construction, and which is substantially constructed of fabricated parts. Other objects and advantages of the invention will be apparent from the following description taken in conjunction with the accompanying drawings wherein:

BRIEF DESCRIPTION OF THE DRAWINGS

FIG. 1 is a partially broken, elevational view of a combined fluid power operated control mechanism and sliding gate valve combination embodying the invention;

FIG. 2 is a sectional view taken generally along the plane of line 2—2 of FIG. 1, looking in the direction of the arrows, and particularly showing the top or outer support member and the connection of reciprocal motor units and of the ends of the constant force spring assemblies thereto;

FIG. 3 is a fragmentary, vertical sectional view taken generally along the plane of line 3—3 of FIG. 2, and showing the connection of the ends of the constant force springs to the movable outer support member, with the latter being guided for its movement relative to the lower or inner support member, by guide posts extending upwardly from the lower support member;

FIG. 4 is a fragmentary, sectional view of the control mechanism of the invention as mounted on the bonnet of a conventional slide valve and coupled thereto, for actuation of the gate valve from a remote location; various of the components of the control mechanism are shown in dot-dash lines in the FIG. 4 illustration;

FIGURE 5 is a diagrammatic elevational view of the slide gate valve and associated control mechanism and power system therefor, for operating the gate valve from a remote position, and as installed on a tank trailer vehicle as one example of environmental use;

FIG. 6 is generally diagrammatic illustration of the control mechanism and gate valve combination coupled to a manual pump system that is adapted to furnish pressurized fluid to the control mechanism, for operating the latter, and corresponds to the system illustrated in mounted condition on the trailer vehicle of FIG. 5.

DESCRIPTION OF PREFERRED EMBODIMENT

Referring now again to the drawings, there is shown a slide type gate valve 10 (FIGS. 1, 4, 5 and 6) of generally known construction, disposed within a conduit section 12 which may include on each end thereof an apertured, flanged portion 12a, 12b for coupling the gate valve into a pipeline or conduit line of a tank truck, or a storage tank, or a pipeline, or the like, and particularly those which carry hazardous (e.g. inflammable) fluids or liquids, for controlling the flow of the liquid material from a remote location, through the line.

Gate valve 10 includes valve heads 16 (FIG. 4) which are each adapted for engagement with a respective one of the opposing valve seats 16a on conduit section 12, when the valve is in closed condition, with the valve heads 16 being connected to operating rod 18 which in the embodiment illustrated in FIGS. 1 and 4 extends upwardly from the heads 16 through the gate valve bonnet 20 and collar 22 secured as by welds 22a to the bonnet 20, and with the collar including a stuffing box mechanism 26, for sealing the movable operating rod with respect to the exterior of the bonnet 20, and as will be hereinafter discussed in greater detail.

The operating rod extends, in the embodiment illustrated, past the stuffing box 26 and is connected to what will be referred to as upper or outer support 28 of the fluid pressure operated valve control mechanism 30.

Control mechanism 30 comprises a pair of supports which includes the aforementioned member 28 (the outer support) and a lower or inner support 32, which is mounted on and preferably detachable secured to the bonnet 20 of the slide gate valve, and as will be hereinafter described in greater detail.

Constant force spring means 36 (FIGS. 2 and 3) coact between the supports 28 and 32, and urge the supports toward one another. The constant force springs are preferably sized and adjusted to suit the desired or necessary requirements of the slide valve specified closing pressure and when assembled into the fluid pressure operated control mechanism 30, are fixed in position to prevent change in use. The force required to move the outer support 28 relative to the inner support 32 does not increase appreciably irrespective of the distance of relative movement between supports 28 and 32, since the load on the constant force springs does not increase with the length of travel thereof, and thus the force required to open the slide gate valve remains generally constant.

The control mechanism-gate valve combination can accept springs of varying size, as above mentioned, to suit the specifications required by the user, and the spring spools 37 of the spring means 36, rotatably mounted on the lower or inner support 32 do not need any adjustment. Spools 37 of the constant force spring means 36 are, in the embodiment illustrated, rotatably mounted in pairs on U-bracket 37a which is secured as by bolts 37b to the lower or inner support 32. The spring tape 38 of each spool is coiled about its respective rotatable spool 37 and then is attached at its distal end to the upper or outer support 28. This attaching of the distal ends of the spooled spring tapes to the support plate 28 in the embodiment illustrated, comprises dowels 40 extending through openings 41 (FIG. 3) in the spring tape ends, and coacting with the top surface 42 of the outer support member 28, to hold the distal ends of the spring tapes in anchored but detachable condition relative to support 28.

Each constant force spring mounted on inner support 32 and attached to the outer support 28, may be preloaded with a force of, for example, approximately 200 pounds, in the control mechanism-gate valve combination shown, with such force being constant as aforementioned and not increasing during outward and inward movement of the outer support relative to the inner support. However, as aforementioned, the spring means is adapted to be sized to suit the requirements of the valve closing pressure specified for a particular assembly and the control mechanism is adapted to be able to accept spring means of varying size.

The inner support member 32 comprises a plate-like portion 44 having depending seats 46 secured as by welds 46a to the plate portion 44. In this connection plate portion 44 is preferably recessed from opposing peripheral edges thereof, as at 47 (FIG. 2) for receiving seats 46.

Extending upwardly or outwardly from plate portion 44 and attached thereto is a pair of spaced studs 48 (FIG. 4) which are threaded as at 50, and which extend through aligned openings in winged member 52 of stuffing box 26, with nuts 54 coacting in threaded relationship with the threaded distal end of the respective stud 48, so as to detachably secure the lower or inner plate structure 46 to the stuffing box 26. It will be seen that tightening of nuts 54 causes increase compression of the packing 56 in the stuffing box, to thereby provide for increasing or decreasing the sealing relationship between the packing and the exterior surface of reciprocal operating rod 18 of the sliding gate valve.

The aforementioned seats 46 on plate portion 44, of inner support 32 position a respective single acting reciprocal fluid powered motor unit 58, which at one end is positioned but not fastened onto its respective seat (as at 59) and at the other end thereof, has its piston rod 60 attached or fastened as by means of threaded nuts 62, to the outer support 28 of control mechanism 30.

It can be best seen from FIG. 2 that the upper support 28 is a plate-like member which has peripheral recesses or slots 64 therein through which extends the piston rod 60 of the respective motor unit 58, which rods are secured to the plate 28 by the aforementioned nuts 62.

Extending out of the bottom portion of each of the motor units is a feed conduit or line 66 connected to the fluid entry and exit port of the motor unit 58 and which is adapted to furnish pressurized hydraulic fluid to the respective motor unit, for actuating the same and thus causing outward movement of the associated piston rod 60 thereof with respect to the cylinder of the respective motor unit 58. Outward movement of piston rod 60 of motor units 58 causes relative movement of the support 28 away from the stationary inner support 32, thus causing opening of the associated slide gate valve 10.

Feed lines 66 from motor units 58 extend upwardly as best viewed in FIG. 3 to a T-fitting 68 with each such conduit or feed line section 66 being of substantially the same length and diameter, so as to provide for generally equal travel of the piston rods of equal size motor units 56 during actuation thereof. T-fitting 68 may be attached to the underside of support plate 44 by bracket 69 and aforementioned bolts 37b extending through openings therein, and with the fitting being coupled by any suitable conduit means (e.g. 70, 70a) to a manually actuated (in the embodiment illustrated) pump 72, which may include an operator's handle 72a, for manual actuation or pumping by an operator, to control the actuation of control mechanism 30 from an area remote from the slide valve-control mechanism assembly. Pump 72 includes manual control valve 74 and a conventional internal pressure relief valve (not shown) in circuit with pump 72 and associated reservoir 76, so as to enable return of the fluid pressure applied by the pump to motor units 58 back to reservoir upon opening of valve 74, or upon dumping of the fluid pressure in the system as will be hereinafter discussed. Pump 72 or its equivalent could be actuated by means of an electric or other type motor unit for pressurizing reciprocal motor units 58; however, a manual pump is preferred.

Mounted on the plate portion 44 of the inner support 32 are four spaced columns or rods 78 (FIGS. 2 and 3) which are attached to and extend upwardly from support 32 and pass through openings 80 in the outer support 28 so that the outer support 28 is guided in its movement relative to the lower support by such guide post 78. Post 78 may be detachably assembled with support 32 by means of threaded ends 78a received in complementary threaded openings in the support.

Tubular members 82 may encompass the lower portion of each of the guide rods 78 as best shown in FIG. 3, and provide positive stop means for limiting the inward or downward movement of outer support 28 relative to inner support 32. Also, upper tubular members 82a may be provided in encompassing relationship to the respective guide post for positively limiting the movement of support member 28 in a direction away from support member 32. In this connection, rods or posts 78 are provided with abutment nuts 84 thereon adapted for limiting engagement with members 82a. It will be understood therefore that the upper or outer stop members 82a move with the outer support 28 in its movement, and can be provided in any desired length so as to effectively limit the maximum movement of the outer support 28 outwardly relative to lower support 32. Stop member 82a may be attached to support 28 for movement therewith.

Referring now in particular to FIGS. 1, 2, and 4, aforementioned operating rod 18 of the sliding gate valve 10 extends through sleeve 86 secured as by welds 86a to outer support 28, and through opening 88 in support 28, and is detachably secured in threaded coaction to the outer support 28 by means of the nut assembly 89.

Nut assembly 89 may include housing receptacle 90 welded as at 90a to the upper surface of the outer support 28, and has a threaded interior for receiving in threaded coaction the cap 92 which is threaded on its lower portion exterior, and received in threaded coaction in receptacle 90. Threaded nut 93 secured to the associated threaded end of the operating rod 18 of the gate valve is disposed in retained condition between the confronting surface of support 28 and the filler plug 94 in cap 92.

It can be best seen from FIG. 4 that the collar 22 welded, as at 22a, to the upper or outer end of the bonnet 20 of this valve 10 and conduit section 12 assembly has a neck portion which is threaded on its exterior as at 96. A pair of jam nuts 98 may be provided in threaded coaction with the threaded section 96 of the collar, and abutting sleeve 100 attached to support assembly 32, for holding the inner or lower support assembly 32 securely on the bonnet 20.

Encompassing the aforedescribed control mechanism components may be a housing or cover member 104 (which in the embodiment illustrated is of cylindrical configuration) which is closed at the top or outer end thereof and open at the bottom or inner end thereof, as best shown in FIG. 3. Housing 104 may include an exterior semicircular bracket 106 including laterally projecting portion 106a thereon, for aiding in supporting the gate valve-control assembly in any desired position, depending upon the desires and conditions found in use. The housing 104 and bracket 106 are detachably attached to the plate portion 44 of the inner support 32, and as by means of respective bolts 108 which extend through openings in the arcuate bracket 106 and housing 104, and into complementary threaded openings in plate 44. Bracket 106 and housing 104 may be mounted in two positions approximately 180° apart, depending on the application of the valve control unit assembly.

The housing may be provided with an elongated slot 110 therein (FIG. 6) through which extends an indicator pin 112 (FIGS. 2 and 3) which is threaded into or otherwise secured to the periphery of the movable outer support member 28 to enable someone to determine when the valve 10 is open or closed by merely looking at the exterior of the housing of the control mechanism.

If one of the piston and cylinder units 58 fails, which is the part of the control mechanism most likely to go after extended use, it can be replaced by simply removing the housing 104 upon removal of attaching bolts 108, and then by loosening the nuts 62 fastening the respective motor unit 50 to the outer support 28 and disconnecting the motor unit from its conduit section 66 at the bottom or inner end thereof the motor unit 58 can be readily pulled out of the control assembly. Accordingly, the whole assembly need not be removed from the vehicle or related equipment on which it is mounted in order to service the motor units 58. Reassembly of a new or repaired motor unit 58 can be accomplished by reversing the above steps.

It will also be noted that the control mechanism 30 may be removed, repaired and/or replaced from the slide valve without disturbing the slide valve mounted on the vehicle or related equipment. This can be accomplished by removal of the housing or cover 104 by removal of the attaching bolts 108, to expose the nuts 54 for removal from studs 48, and then removal of the jam nuts 98 and detachment of conduit 70 will release the control mechanism from its mounted position on the outer end of the bonnet 20 of the slide valve.

Referring now in particular to FIG. 5 which illustrates one example of environmental use of the valve-control assembly, and particularly one installed on a tank truck vehicle T, it will be seen that the pressurized hydraulic fluid from pump 72 operating motor units 58 can be released manually from an area remote from the gate valve 10 by opening control valve 74 on the pump which permits the spring means 36 of the control assembly 30 to move the outer support 28 toward the inner support 32 to thereby close the gate valve 10 causing the valve heads 16 to engage their respective seats 16a, and thus shut off the flow of material from the tank which had been passing through conduit section 12 of the gate valve to discharge hose 116. To restart the flow from the tank T, pressurized fluid as provided by the pump system 72 has to be applied to motor units 58.

To provide for automatic closing in the event of a fire, conduit line 70 (or conduit line sections 66) may be provided with meltable fuses or thermally actuated openers (e.g. 118—FIG. 5) of conventional type, well known in the art, so as to melt or open in the event of a fire raising the ambient temperature to a predetermined degree, which thus opens up the associated conduit 66, 70 or 70a and dumps the fluid from the system, thereby permitting the spring means 36 to automatically close the gate valve.

It will be understood that any spring load can be readily accommodated into the valve-control assembly by combinations of pairing springs, adding laminations to the springs, or varying the width of the spring tapes.

From the foregoing discussion and accompanying drawings, it will be seen that the invention provides a novel fluid power operated control mechanism for controlling the actuation of a sliding gate valve or the like, adapted for use in tank trucks, in pipelines, or the like, and which may be readily assembled to and disassembled from the valve, and wherein the control mechanism may be operated manually from an area remote from the valve, and which may also include means for automatically dumping the fluid system in the event of damage or fire, to permit the gate valve to automatically move to its closed position.

The invention also provides a novel fluid power operated mechanism which embodies constant force spring means coacting between relatively movable supports, which spring means urge the latter to predetermined relationship between one another, and wherein fluid powered reciprocal motor means coacting between the supports are provided for actuation from a source of pressurized fluid, and are adapted to move the supports relative to one another against the bias of the spring means, to cause movement of the gate valve operating rod, and thus actuation of the gate valve.

The terms and expressions which have been used are used as terms of description, and not of limitation, and there is no intention in the use of such terms and expressions of excluding any equivalents of any of the features shown or described, or portions thereof, and it is recognized that modifications are possible within the scope of the invention claimed.

We claim:

1. Fluid power operated mechanism for controlling actuation of a sliding gate valve or the like, adapted for use in tank trucks, pipelines and the like comprising, spaced supports, one of said supports including means for attaching the operating rod of a sliding gate valve thereto, constant force spring means coacting between said supports and urging the latter toward one another, means for guiding the movement of said one support relative to the other support, and fluid powered reciprocal motor means extending between said supports and when actuated from a source of pressurized fluid, adapted to move one of said supports relative to the other support against the bias of said spring means to cause movement of the gate valve operating rod and thus actuation of the gate valve, said means for guiding said one support including guide posts supported on said other support, and extending outwardly relatives thereto and through openings in said one support, sleeve means generally encompassing the respective siad guide posts and extending between said supports for limiting movement of said one support toward said other support during relative movement between said supports, and said guide posts preventing tilting of said one support relatigve to said other support during relative movement between said supports, said spring means comprises a spool of constant force spring rotatably mounted on said other support with a spring tape thereof being coiled about said spool and then attached at its distal end to said one support, resulting in preloading of said spring tape means a predetermined amount.

2. A mechanism in accordance with claim 1 wherein said other of said supports is fixed and said one support is movable relative to said other support upon actuation of said motor means.

3. A mechanism in accordance with claim 1 wherein said one support is disposed above the other support and is movable upwardly away from said other support upon actuation of said motor means.

4. A mechanism in accordance with claim 1 wherein said motor means comprises at least one pair of single acting reciprocal hydraulic piston and cylinder motor units disposed in equally spaced relation from the first mentioned means.

5. A mechanism in accordance with claim 2 wherein said one support comprises a generally platelike member to which one end of said motor means is attached and said other support comprises a plate-like member having seats thereon with said motor means comprising a pair of reciprocal piston and cylinder motor units each of which is disposed in a respective one of said seats, and means for attaching said other support to the bonnet of the associated gate valve, for supporting and securing said mechanism on the gate valve.

6. A mechanism in accordance with claim 1 including a housing encompassing said motor means, said spring means and said supports, and means removably securing said housing to said other support.

7. A mechanism in accordance with claim 1 wherein said spring means comprises pairs of spools of constant force springs rotatably mounted on said other support with a constant force spring tape of each spring means being coiled about its respective spool and then attached at its distal end to said one support.

8. A mechanism in accordance with claim 7 wherein the attachment of the distal ends of said spring tapes to said one support comprises dowel means extending through openings in said spring tape ends and coacting with said one support to hold the distal ends of said spring tapes in connected condition relative to said one support.

9. A mechanism in accordance with claim 1 including stop means coacting with said guide posts in outwardly spaced relation to said one support and adapted to limit the outward movement of said one support relative to said guide posts and to said other support.

10. A mechanism in accordance with claim 1 including conduit means coupled to the respective of said motor means and extending to a source of pressurized fluid for providing for selective actuation of the motor means to cause movement of said supports relative to one another, said conduit means extending to a tee fitting with said conduit means to each motor means being of substantially the same length and diameter so as to provide for generally equal travel of said motor means during actuation thereof.

11. A mechanism in accordance with claim 10 including a single conduit coupled to said tee fitting and extending between the latter and a source of pressurized fluid, and a manual control valve coacting with said source for manually controlling the application of the pressurized fluid to and from said motor means.

12. A mechanism in accordance with claim 11 including a pressure relief means coacting with said source of pressurized fluid so as to return the fluid from the pump of said source to reservoir upon the fluid pressure exceeding a predetermined value in the system.

13. A mechanism in accordance with claim 1 in combination with a sliding type gate valve with the operating rod of the valve extending upwardly from the valve head member through an opening in said one support, and means securing the distal end of said operating rod to said one support so that said operating rod of said gate member moves with the movement of said one support relative to said other support.

14. A mechanism in accordance with claim 1 wherein said other support comprises a plate-like member having means extending outwardly therefrom and adapted for holding coaction with means on a bonnet of the gate valve, for anchoring said other support to the bonnet of the gate valve.

15. A mechanism in accordance with claim 1 in combination with a sliding type gate valve, which includes an operating rod, with the latter being coupled to said one support, and wherein said valve also includes a bonnet, said bonnet has an upwardly projecting collar portion through which movably extends said operating rod of said gate valve, a stuffing box which includes packing, coacting between said rod and said collar portion for sealing the bonnet from the interior and yet providing for relative movement of said operating rod in sealed relation with respect to said collar portion, and means coacting with said stuffing box and anchored to said other support for adjusting the compression of the packing of said stuffing box.

16. A mechanism in accordance with claim 1 including heat meltable fuse means coacting with said motor means for dumping the source of pressurized fluid from communication with said motor means upon the occurrence of melting of said fuse means.

17. A mechanism in accordance with claim 1 including thermal means for automatically dumping the fluid power system from communication with said motor means upon raising of the ambient temperature of said mechanism above a predetermined value.

18. A mechanism in accordance with claim 1 including manual control means coacting with the source of pressurized fluid for selectively isolating pressurized fluid from communication with said motor means, upon actuation of said manual control means.

19. A mechanism in accordance with claim 6 including a sliding gate valve to which said mechanism is attached with the operating rod of said gate valve secured to said one support, said valve and said mechanism being constructed of primarily fabricated components except for said motor means and said spring means.

* * * * *